Patented June 3, 1924.

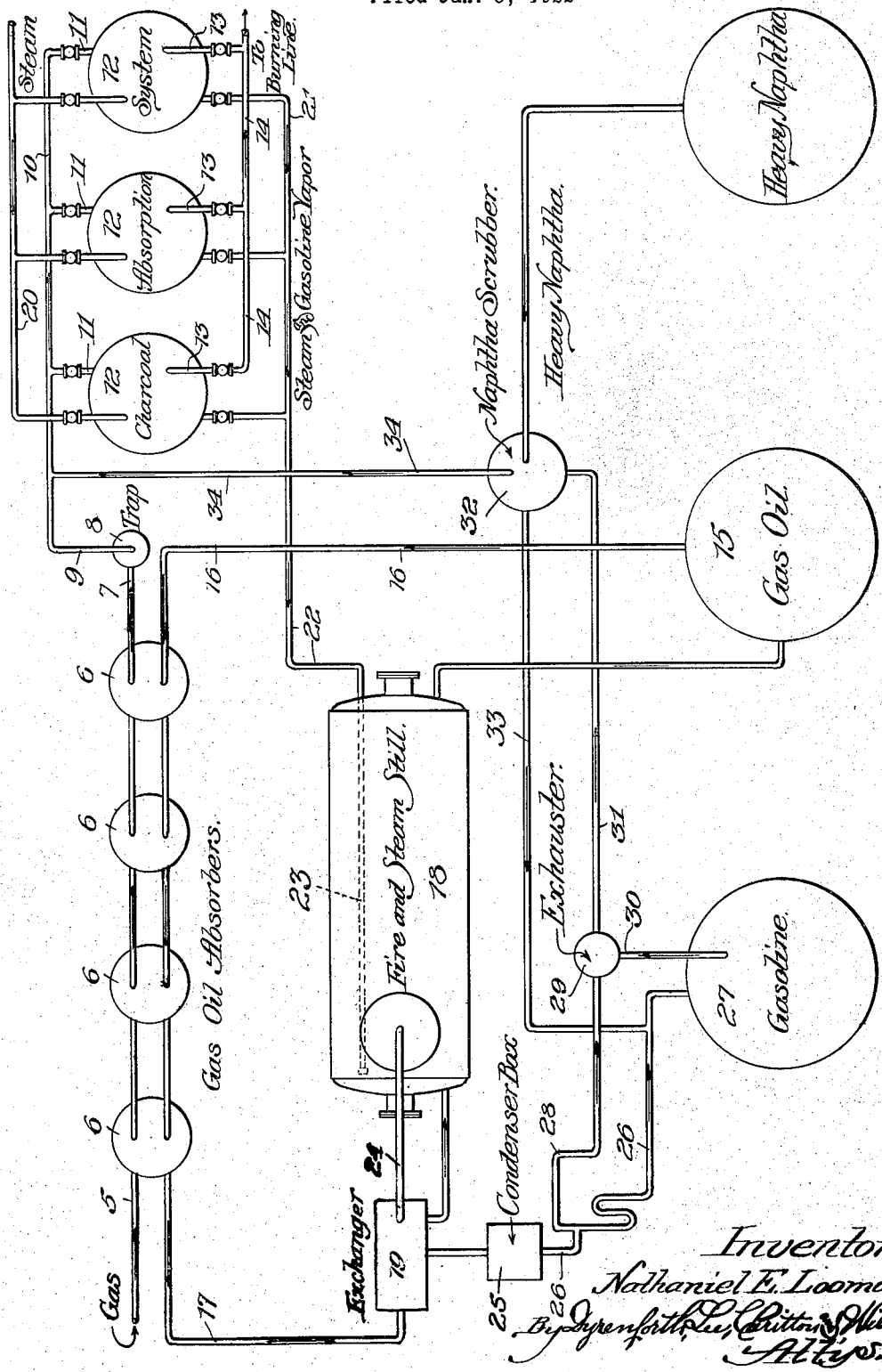

1,496,061

UNITED STATES PATENT OFFICE.

NATHANIEL E. LOOMIS, OF ELIZABETH, NEW JERSEY, ASSIGNOR TO STANDARD DEVELOPMENT COMPANY, A CORPORATION OF DELAWARE.

RECOVERY OF GASOLINE.

Application filed January 3, 1922. Serial No. 526,733.

*To all whom it may concern:*

Be it known that I, NATHANIEL E. LOOMIS, a citizen of the United States, residing at 589 Jefferson Avenue, Elizabeth, in the county of Union and State of New Jersey, have invented a new and useful Improvement in the Recovery of Gasoline, of which the following is a specification.

The present invention relates to the recovery of gasoline from natural gas, refinery gas or other gases containing gasoline constituents in vapor form. It will be fully understood from the following description, illustrated by the accompanying drawing, in which apparatus suitable for carrying out the invention is diagrammatically shown.

Referring to the drawing, the gas containing gasoline constituents enters the recovery system through pipe 5, which leads it into suitable liquid absorbers, designated by the numeral 6, of which four are shown in series. It is readily apparent that a single absorber may be used, if desired, or that any number may be employed in series. In the absorbers the gas passes in counter current through a liquid absorbent, which may suitably be gas-oil, that is, a hydrocarbon oil distillate having a boiling point range between 450 and 700° F., although any other suitable absorbent, such as heavy naphtha, may be employed. In passing through the absorbers 6, the gas is to a large extent denuded of its gasoline constituents, the residual gas passing out through pipe 7 and trap 8 to a line 9 leading into a manifold 10. From the manifold 10 a number of branch pipes 11 lead into absorbers 12 containing a suitable solid absorbent, such as activated charcoal, silica gel or the like. Valves are provided in the pipes 11 leading into these absorbers so that gas may be caused to pass through one or more of the absorbers while absorbed gasoline is being driven out of others. From the charcoal absorbers the gas, substantially completely denuded of its gasoline constituents, passes out through pipes 13 into a manifold 14 leading to the gas line for dry or burning gas.

The absorbent liquid for the absorbers 6 is supplied from a suitable reservoir 15 and is led to the absorbers through pipes 16, passing through the absorbers in counter current to the gas. From the absorbers the absorbent liquid, containing the absorbed gasoline constituents, passes through pipe 17 into a still 18, being suitably preheated, if desired, by passing through a heat exchanger 19, in which it is heated by the vapors issuing from the still 18, before entering the latter.

After any of the charcoal absorbers has absorbed a proper amount of gasoline constituents from the gas passing through it, the flow of gas into it is cut off and superheated steam, for example, at a temperature of about 300° C. is passed into the absorber from manifold 20. The steam passing through the solid absorbent carries off gasoline constituents, the steam and gasoline vapors entering the manifold 21 and passing through pipe 22 into the distributing pipe 23 in the still 18. The still 18 may, if desired, be supplied with direct heat as well as the heat of the entering steam and vapor. In the still the gasoline constituents are stripped from the liquid absorbent used in the absorbers 6, and its vapors, together with the gasoline vapors and steam from the solid absorbent, pass out through the vapor line 24 and, if desired, through exchanger 19 through a suitable cooler 25. The condensed gasoline and cooled gas from the cooler 25 are separated by means of a trap 26, the liquid passing on to the gasoline receiver 27 and the separated gases passing off through line 28.

If desired, a slight vacuum may be produced in the still 18 and in the gasoline receiver 27 by means of an exhauster or blower 29, into which the line 28 and a line 30 from the gasoline receiver 27 may lead. The uncondensed gases are then passed through line 31 into a suitable absorber, in which a suitable liquid, such as heavy naphtha, may be supplied as an absorbent medium. When heavy naphtha is used as the absorbent medium in this absorber 32, the absorbent liquid containing the gasoline constituents derived from the gas may be passed through line 33 directly into the gasoline line 26. The gas from the absorber 32, which has been partially denuded of its gasoline constituents, is passed through line 34 into the manifold 10, leading into the charcoal or solid absorption system.

It is readily apparent that other liquid absorbents than gas-oil may be employed in the absorbers 6. For example, heavy naphtha may be used as an absorbent in them, in which case the absorbent liquid, with the absorbed gasoline constituents from the gas may pass directly into a gasoline receiver, or may be directed into a suitable still, into which the steam and gasoline vapors from the charcoal absorption system are directed for the production of a blended gasoline. Furthermore, gas-oil may be employed in the absorber 32 into which the cooled gases from the still 18 are directed, the absorbent liquid with the absorbed gasoline constituents then being directed into the still 18 in the same manner as the absorbent liquid from the absorbers 6.

I claim:

1. The process of recovering gasoline constituents from hydrocarbon gas containing them which comprises subjecting the said gas to the action of a liquid absorbent for said gasoline constituents, thereby partially denuding the gas thereof, and subjecting the residual gas to the action of a solid absorbent for the gasoline constituents thereof until the solid absorbent has been saturated with the desired gasoline constituents.

2. The process of recovering gasoline constituents from hydrocarbon gas containing them which comprises passing said gas through a liquid absorbent for the gasoline constituents therein, thereby partially denuding the gas of said gasoline constituents, passing the residual gas through a solid absorbent, subsequently heating the solid absorbent to remove the gasoline constituents therefrom in vapor form and blending the gasoline constituents removed from the solid absorbent with the gasoline constituents contained in the liquid absorbent.

3. The process of recovering gasoline constituents from hydrocarbon gas containing them which comprises passing said gas through a liquid absorbent for the gasoline constituents therein, thereby partially denuding the gas thereof, passing the residual gas through a solid absorbent for the gasoline constituents therein, subsequently heating the solid absorbent to remove the gasoline constituents therefrom, and passing the vapors of said gasoline constituents into the liquid absorbent containing the initially absorbed gasoline constituents, from the gas.

4. The process of recovering gasoline constituents from hydrocarbon gas containing them which comprises subjecting said gas to the action of a liquid absorbent heavier than gasoline, thereby partially denuding the gas of its gasoline constituents, subjecting the residual gas to the absorbent action of a solid absorbent for its gasoline constituents, subsequently heating the solid absorbent to remove therefrom the absorbed gasoline constituents, heating the liquid absorbent containing the absorbed gasoline constituents of the gas, and passing through the heated liquid absorbent the gasoline vapors from the solid absorbent.

5. A process of recovering gasoline constituents from hydrocarbon gas containing them, which comprises subjecting said gas to the action of a liquid absorbent heavier than gasoline, thereby partially denuding the gas of its gasoline constituents, subjecting the residual gas to the action of a solid absorbent for its gasoline constituents, heating the liquid absorbent containing absorbed gasoline constituents, condensing the gasoline and passing the uncondensed vapors given off from said absorbent through the solid absorbent together with the residual gas aforesaid.

6. A process of recovering gasoline constituents from hydrocarbon gas containing them, which comprises subjecting said gas to the action of a liquid absorbent heavier than gasoline, thereby partially denuding the gas of its gasoline constituents, subjecting the residual gas to the action of a solid absorbent for its gasoline constituents, heating the liquid absorbent containing absorbed gasoline constituents, condensing the gasoline and passing the uncondensed vapors given off from said absorbent through the solid absorbent together with the residual gas aforesaid, passing steam through the solid absorbent to remove the gasoline constituents therefrom and passing the steam and gasoline constituents so removed into the heated body of the liquid absorbent.

7. A process of recovering gasoline constituents from hydrocarbon gas containing them, which comprises subjecting said gas to the action of a liquid absorbent heavier than gasoline, thereby partially denuding the gas of its gasoline constituents, heating the liquid absorbent containing absorbed gasoline constituents, condensing the gasoline and passing the uncondensed vapors given off from said absorbent through a liquid absorbent, and passing the gases unabsorbed by the liquid absorbents through a solid absorbent for the gasoline constituents thereof.

NATHANIEL E. LOOMIS.